(12) United States Patent
Okada

(10) Patent No.: US 7,355,933 B2
(45) Date of Patent: Apr. 8, 2008

(54) OPTICAL PICKUP DEVICE

(75) Inventor: Yutaka Okada, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 480 days.

(21) Appl. No.: 10/635,528

(22) Filed: Aug. 7, 2003

(65) Prior Publication Data

US 2004/0027939 A1    Feb. 12, 2004

(30) Foreign Application Priority Data

Aug. 7, 2002   (JP)  ............................. 2002-230179
May 28, 2003   (JP)  ............................. 2003-150991

(51) Int. Cl.
  *G11B 7/00*   (2006.01)
(52) U.S. Cl. .................... 369/44.37; 369/103
(58) Field of Classification Search ............... 369/103, 369/44.12, 44.37
  See application file for complete search history.

(56) References Cited

U.S. PATENT DOCUMENTS

| | | | | |
|---|---|---|---|---|
| 5,416,765 A | * | 5/1995 | Aikoh et al. | 369/112.12 |
| 5,644,413 A | * | 7/1997 | Komma et al. | 369/44.23 |
| 5,659,531 A | * | 8/1997 | Ono et al. | 359/495 |
| 5,708,644 A | * | 1/1998 | Hasegawa | 369/44.12 |
| 5,790,502 A | * | 8/1998 | Horinouchi et al. | 369/112.09 |
| 5,822,293 A | * | 10/1998 | Lee et al. | 369/44.23 |
| 6,005,835 A | * | 12/1999 | Tsuji et al. | 369/112.15 |
| 6,014,359 A | * | 1/2000 | Nagano | 369/112.07 |
| 6,496,469 B1 | | 12/2002 | Uchizaki | |
| 6,552,317 B1 | * | 4/2003 | Takeda et al. | 250/201.5 |
| 6,693,871 B2 | | 2/2004 | Uchizaki | |
| 6,822,771 B2 | * | 11/2004 | Funato et al. | 359/15 |
| 6,856,584 B2 | * | 2/2005 | Saimi et al. | 369/44.23 |
| 6,920,102 B2 | * | 7/2005 | Mizuno et al. | 369/112.01 |
| 7,042,819 B2 | * | 5/2006 | Tsuda | 369/44.41 |
| 2002/0141321 A1 | * | 10/2002 | Wada et al. | 369/112.18 |
| 2003/0048736 A1 | * | 3/2003 | Takahashi et al. | 369/112.17 |
| 2003/0081514 A1 | * | 5/2003 | Iwata | 369/44.32 |

(Continued)

FOREIGN PATENT DOCUMENTS

JP    3-225835 A    10/1991

(Continued)

*Primary Examiner*—Wayne Young
*Assistant Examiner*—Van T. Pham
(74) *Attorney, Agent, or Firm*—Birch, Stewart, Kolasch & Birch, LLP

(57) ABSTRACT

Substantially all of the laser light emitted from laser chip(s) 11 toward optical disk(s) 17 may be transmitted through polarizing hologram(s) 13 and may thereafter be transmitted through quarter-wave plate(s) 15, and after being reflected at optical disk(s) 17, may again be transmitted through quarter-wave plate(s) 15 and be incident on polarizing hologram(s) 13. Accordingly, where laser light is transmitted twice through quarter-wave plate(s) 15, the direction(s) of polarization thereof may be rotated by 90 degrees before it is incident on polarizing hologram(s) 13. For this reason, even if laser light is p-polarized when it is transmitted through polarizing hologram(s) 13 from laser chip(s) 11, it may be s-polarized when it is again transmitted through polarizing hologram(s) 13 after being reflected from optical disk(s) 17. Laser light, after being made s-polarized, may be diffracted by polarizing hologram(s) 13, which diffracts only s-polarized light. Light of order ±1 produced as a result of diffraction of laser light by polarizing hologram(s) 13 may be incident on photodiode(s) 18.

12 Claims, 4 Drawing Sheets

U.S. PATENT DOCUMENTS

| | | | |
|---|---|---|---|
| 2003/0174631 A1* | 9/2003 | Nishiyama et al. | 369/112.06 |
| 2004/0027968 A1* | 2/2004 | Horimai | 369/103 |
| 2004/0090882 A1* | 5/2004 | Saimi et al. | 369/44.23 |
| 2005/0088948 A1* | 4/2005 | Ohuchida | 369/112.1 |
| 2005/0135207 A1* | 6/2005 | Katayama | 369/44.23 |

FOREIGN PATENT DOCUMENTS

| | | |
|---|---|---|
| JP | 5-205295 A | 8/1993 |
| JP | 2565185 B2 | 10/1996 |
| JP | 2000-30285 A | 1/2000 |
| JP | 2001-102676 A | 4/2001 |
| JP | 2001-273666 A | 10/2001 |
| JP | 2002-74729 A | 3/2002 |

* cited by examiner

OPTICAL PICKUP DEVICE

BACKGROUND OF INVENTION

The present invention pertains to an optical pickup device wherein laser light is emitted toward an optical disk and said laser light is detected after being reflected from the optical disk.

Conventional optical pickup devices of this type include, for example, those similar to that shown at FIG. 6. In this optical pickup device, laser light is emitted from laser chip 101 and this laser light is split into a main beam and side beams at diffraction grating 102, the laser light, after being split in such fashion, exiting therefrom so as to be directed toward optical disk 106 by way of hologram 103, collimating lens 104, and objective lens 105. In addition, after being reflected at optical disk 106, said laser light is incident on hologram 103 by way of objective lens 105 and collimating lens 104; and this laser light being diffracted at hologram 103, only light of order 1 produced as a result of such diffraction is incident on photodiode 107. Accordingly, light of order 1 present in the main beam and light of order 1 present in the side beams is incident on photodiode 107. Photodiode 107 carries out photoelectric conversion with respect to light of order 1 present in the main beam to generate and output an RF signal, and carries out photoelectric conversion with respect to light of order 1 present in the side beams to generate and output a tracking error signal.

Furthermore, disclosed at Japanese Patent No. 2565185 is a device employing a nonpolarizing beamsplitter or a polarizing beamsplitter in place of the hologram 103 of the device at FIG. 6.

However, in the aforementioned conventional optical pickup devices, the efficiency with which laser light is utilized is low and there is, moreover, a high level of optical noise due to the laser light reflected from optical disk 106.

Laser light from the laser chip 101 is split at diffraction grating 102 and is diffracted at hologram 103, only light of order 0 therefrom reaching optical disk 106. In addition, laser light reflected from optical disk 106 is again diffracted by hologram 103, only light of order +1 therefrom being incident on photodiode 107. Here, taking the intensity of the laser light emitted from laser chip 101 to be 1, and taking the ratio of the intensities of the light of order 0 and of order ±1 produced as a result of diffraction by hologram 103 to be 1:4:1 (order −1:order order 0:order +1), because the fractional amount of light of order 0 reaching optical disk 106 by way of hologram 103 from laser chip 101 is $4/6$, the fractional amount of light of order +1 incident on photodiode 107 by way of hologram 103 from optical disk 106 will be $(4/6) \times (1/6) = 0.11$, and it is clear that the efficiency with which laser light is utilized is low.

Furthermore, light of order 0 which is reflected from optical disk 106 and is transmitted through hologram 103 to return to laser chip 101 represents a source of optical noise. While attempts have been made to incline the stem of laser chip 101 or to paint the area around the optical path of the laser light black, this has not resulted in satisfactory reduction in optical noise.

Furthermore, in the device disclosed at Japanese Patent No. 2565185, because most of the light reflected from the optical disk returns to the laser chip by way of the nonpolarizing beamsplitter or the polarizing beamsplitter, the effect of optical noise has been large.

It is therefore an object of the present invention, which was conceived in light of the foregoing conventional problems, to provide an optical pickup device that utilizes laser light with high efficiency and that permits generation of optical noise to be held in check to a sufficient degree.

SUMMARY OF INVENTION

In order to solve one or more of the aforementioned problems, in the context of an optical pickup device in which laser light is emitted from one or more laser chips toward one or more optical disks by way of at least one or more diffraction gratings and one or more holograms, at least a portion of the laser light being incident on one or more light-receiving elements by way of at least one of the hologram or holograms after reflection by at least one of the optical disk or disks, one or more embodiments of the present invention may be such that polarizing hologram(s) capable of diffracting only light polarized in direction(s) perpendicular to direction(s) of polarization of laser light emitted from laser chip(s) is or are employed as hologram(s); and quarter-wave plate(s) is or are provided on at least one or more optical paths between the optical disk(s) and the polarizing hologram(s).

In accordance with embodiment(s) of the present invention constituted in such fashion, polarizing hologram(s) capable of diffracting only light polarized in direction(s) perpendicular to direction(s) of polarization of laser light emitted from laser chip(s) is or are employed; and quarter-wave plate(s) is or are provided to the optical disk side of at least one of said polarizing hologram(s). Quarter-wave plate(s) shift by ¼ in 2π the phase of p-polarized light and s-polarized light which is transmitted therethrough, converting linearly polarized light into circularly polarized light and/or converting circularly polarized light into linearly polarized light. Direction(s) of polarization of laser light transmitted twice through such quarter-wave plate(s) will be rotated by 90 degrees. Here, because polarizing hologram(s) diffract only light polarized in direction(s) perpendicular to direction(s) of polarization of laser light emitted from laser chip(s), such polarizing hologram(s) will transmit all of the laser light emitted from laser chip(s). Such laser light is transmitted through quarter-wave plate(s) and exits therefrom so as to be directed toward optical disk(s), is reflected by such optical disk(s), is again transmitted through quarter-wave plate(s), and is incident on polarizing hologram(s). Accordingly, where laser light is transmitted twice through quarter-wave plate(s), direction(s) of polarization thereof is or are rotated by 90 degrees before it is incident on polarizing hologram(s). Such laser light, the direction(s) of polarization of which have been rotated by 90 degrees, represents light which is polarized in direction(s) perpendicular to direction(s) of polarization of laser light emitted from laser chip(s). For this reason, polarizing hologram(s) diffract such laser light, causing light of order ±1 produced as a result of such diffraction to be incident on light-receiving element(s). That is, all of the laser light is transmitted through polarizing hologram(s) and exits therefrom so as to be directed toward optical disk(s), and after being reflected at optical disk(s), light of order ±1 produced as a result of diffraction of the laser light by polarizing hologram(s) is incident on light-receiving element(s). Accordingly, taking the ratio of the intensities of the light of order 0 and of order ±1 produced as a result of diffraction by polarizing hologram(s) to be 1:4:1 (order −1:order 0:order +1), the fractional amount of light of order 1 which is incident on light-receiving element(s) being $1 \times (2/4) = 0.50$, attainment of satisfactory utilization of laser light is permitted. Furthermore, the light of order 0 produced as a result of diffraction by polarizing hologram(s) does not return to laser chip(s) and so does not represent a source of optical noise.

Furthermore, in one or more embodiments of the present invention, laser chip(s), diffraction grating(s), polarizing hologram(s), and light-receiving element(s) may constitute an integral structure. Alternatively or in addition thereto, laser chip(s) and light-receiving element(s) may constitute an integral structure, and/or laser chip(s) and diffraction grating(s) may constitute an integral structure, and/or polarizing hologram(s) and quarter-wave plate(s) may constitute an integral structure.

Appropriate combination of such integral structure(s) makes it possible to achieve increased precision and simplification of optical pickup device structure.

Moreover, in one or more embodiments of the present invention, diffraction grating(s), polarizing hologram(s), and quarter-wave plate(s) may be arranged in order along optical path(s) from laser chip(s) to optical disk(s).

As a result of such arrangement, it is possible for laser light to be split into main beam(s) and side beams by diffraction grating(s), and for the laser light, after being split in such fashion, to exit therefrom so as to be directed toward optical disk(s) by way of polarizing hologram(s), and for said laser light, after being reflected at optical disk(s), to be diffracted by polarizing hologram(s) such that the light of order ±1 produced as a result of such diffraction is guided to light-receiving element(s). Main beam(s) may be subjected to photoelectric conversion at light-receiving element(s) and may be used for RF signal generation. Furthermore, side beams may be subjected to photoelectric conversion at light-receiving element(s) and may be used for tracking error signal generation.

Furthermore, in one or more embodiments of the present invention, at least one wavelength of laser light emitted from laser chip(s) may be 780 nm and the three-beam method may be used as tracking error detection technique. Alternatively or in addition thereto, at least one wavelength of laser light emitted from laser chip(s) may be 650 nm and the push-pull method may be used as tracking error detection technique.

Any of the various tracking error detection techniques may thus be applied to optical pickup device(s) in accordance with one or more embodiments of the present invention.

DESCRIPTION OF PREFERRED EMBODIMENTS

Below, embodiments of the present invention are described in detail with reference to the attached drawings.

Figure 1:
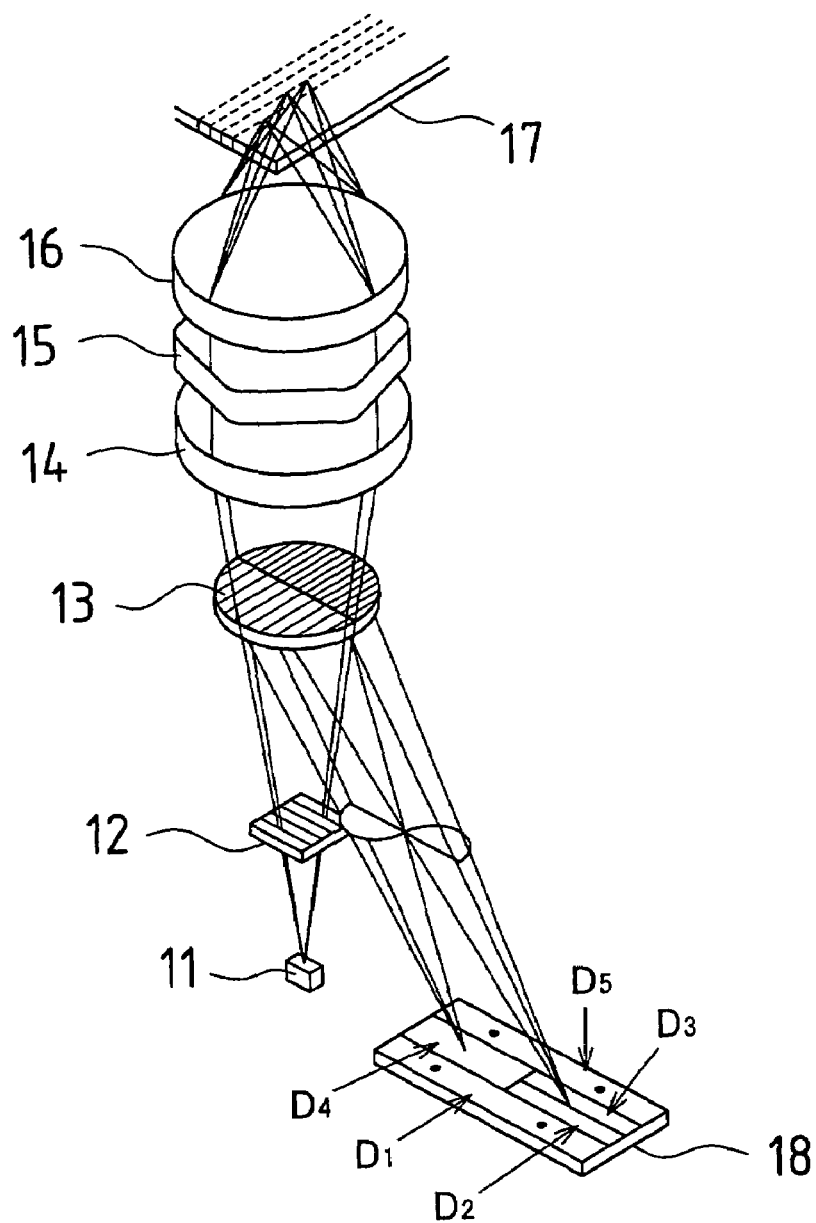
FIG. 1 is an oblique view showing an embodiment of the optical pickup device of the present invention.

FIG. 1 is an oblique view showing an embodiment of the optical pickup device of the present invention. In the optical pickup device of the present embodiment, laser light is emitted from laser chip 11 and this laser light is split into a main beam and a side beam at diffraction grating 12, the laser light, after being split in such fashion, exiting therefrom so as to be directed toward optical disk 17 by way of polarizing hologram 13, collimating lens 14, quarter-wave plate 15, and objective lens 16. In addition, after being reflected at optical disk 17, said laser light is incident on polarizing hologram 13 by way of objective lens 16, quarter-wave plate 15, and collimating lens 14; and this laser light being diffracted at polarizing hologram 13, light of order ±1 transmitted through this polarizing hologram 13 is incident on photodiode 18. At photodiode 18, photoelectric conversion is carried out on light of order ±1 present in the main beam to generate and output an RF signal, and photoelectric conversion is carried out on light of order ±1 present in the side beam to generate and output a tracking error signal.

Figure 2:
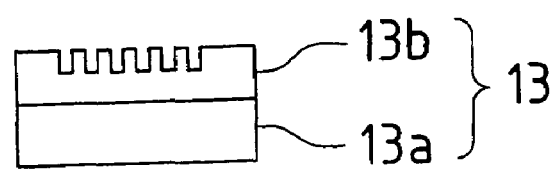
FIG. 2 is a sectional view showing the polarizing hologram in the device at FIG. 1.

Now, polarizing hologram 13, comprising birefringent material 13b laminated onto transparent substrate 13a as shown in FIG. 2, diffracts either only p-polarized light or only s-polarized light.

For example, in the event that the laser light incident on polarizing hologram 13 from laser chip 11 is p-polarized light, a polarizing hologram which will diffract only s-polarized light might be employed as polarizing hologram 13, this being set such that all of the laser light from laser chip 11 is transmitted through polarizing hologram 13.

Furthermore, quarter-wave plate 15 shifts by ¼ in 2π the phase of p-polarized light and s-polarized light which is transmitted therethrough, converting linearly polarized light into circularly polarized light and/or converting circularly polarized light into linearly polarized light. Direction(s) of polarization of laser light transmitted twice through quarter-wave plate 15 will be rotated by 90 degrees.

Now, all of the laser light emitted from laser chip 11 toward optical disk 17 is transmitted through polarizing hologram 13 and is thereafter transmitted through quarter-wave plate 15, and after being reflected at this optical disk 17, is again transmitted through quarter-wave plate 15 and is incident on polarizing hologram 13. Accordingly, where laser light is transmitted twice through quarter-wave plate 15, the direction of polarization thereof will be rotated by 90 degrees before it is incident on polarizing hologram 13. For this reason, even where laser light was p-polarized when it was transmitted through polarizing hologram 13 from laser chip 11, it will be s-polarized when it is again transmitted through polarizing hologram 13 after being reflected from optical disk 17. This laser light which has been made s-polarized is diffracted by polarizing hologram 13, which diffracts only s-polarized light. In addition, light of order ±1 produced as a result of diffraction of laser light by polarizing hologram 13 is incident on photodiode 18.

Here, taking the ratio of the intensities of the light of order 0 and of order ±1 produced as a result of diffraction by polarizing hologram 13 to be 1:4:1 (order −1:order 0:order +1), the fractional amount of light of order ±1 which is incident on photodiode 18 will be 1×(²⁄₄)=0.50. Accordingly, it can be said that satisfactory utilization of laser light is attained. Furthermore, the light of order 0 transmitted through polarizing hologram 13 does not return to laser chip 11 and so does not represent a source of optical noise.

Note that where the laser light incident on polarizing hologram 13 from laser chip 11 is s-polarized light, it is possible to achieve completely identical effect by employing as polarizing hologram 13 a polarizing hologram which diffracts only p-polarized light.

Furthermore, laser chip 11, diffraction grating 12, polarizing hologram 13, and photodiode 18 may constitute an integral structure; and/or laser chip 11 and photodiode 18 may constitute an integral structure; and/or laser chip 11 and diffraction grating 12 may constitute an integral structure; and/or polarizing hologram 13 and quarter-wave plate 15 may constitute an integral structure.

Moreover, there is no objection to using a wavelength of 780 nm for the laser light emitted from laser chip 11 and using the three-beam method as tracking error detection technique; and there is no objection to using a wavelength of 650 nm for the laser light emitted from laser chip 11 and using the push-pull method as tracking error detection technique.

Figure 3:
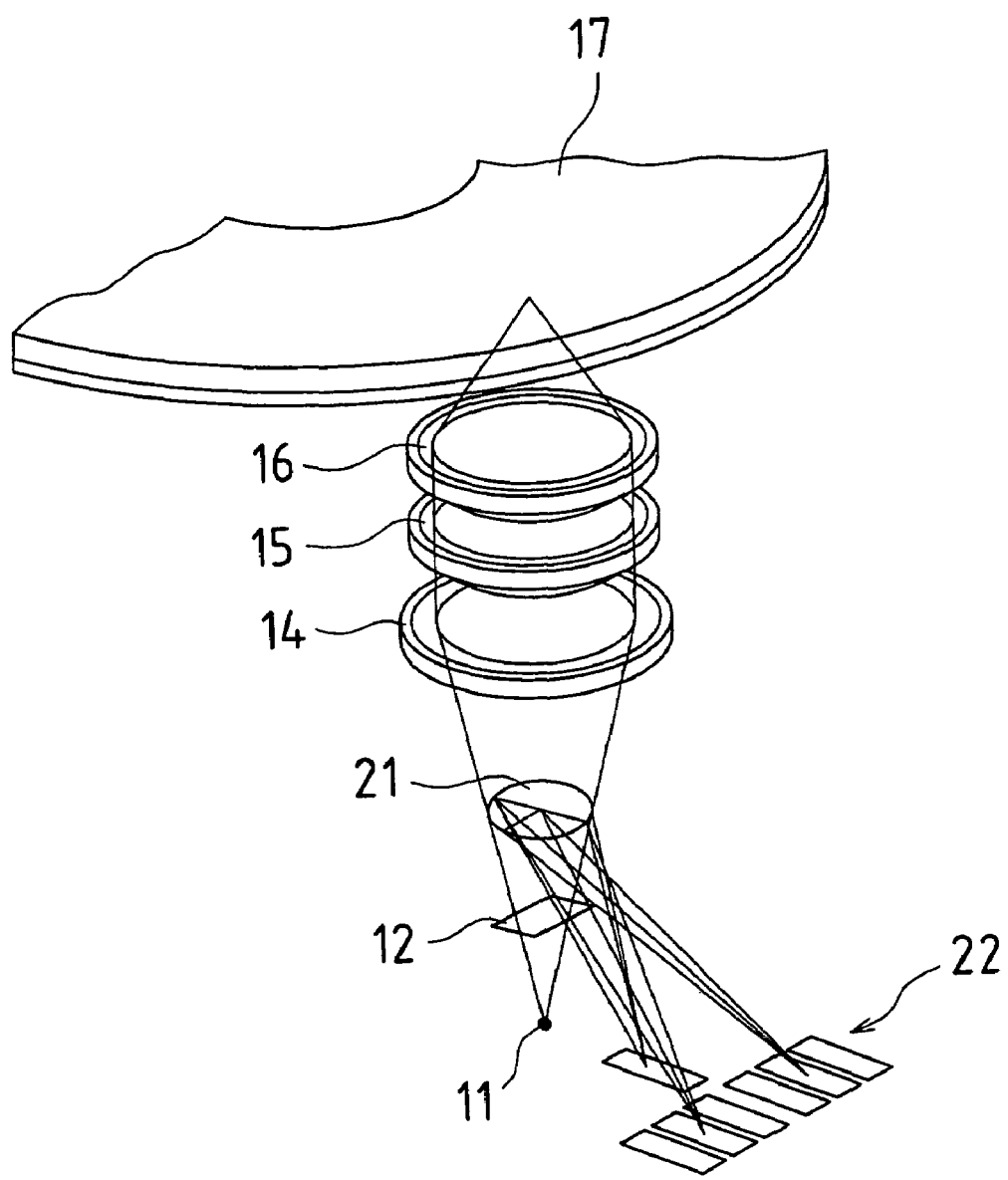
FIG. 3 is an oblique view showing another embodiment of the optical pickup device of the present invention.

FIG. 3 is an oblique view showing another embodiment of the optical pickup device of the present invention. Note that, at FIG. 3, components functioning in like manner to those at the device in FIG. 1 have been given like reference numerals.

The optical pickup device of the present embodiment employs three-beam-diffraction polarizing hologram 21 and photodiode 22 in place of polarizing hologram 13 and photodiode 18 of the device in FIG. 1.

In this optical pickup device, laser light is emitted from laser chip 11 and this laser light is split into a main beam and two side beams by diffraction grating 12, the main beam and respective side beams exiting therefrom so as to be directed toward optical disk 17 by way of three-beam-diffraction polarizing hologram 21, collimating lens 14, quarter-wave plate 15, and objective lens 16. In addition, the main beam and respective side beams, after being reflected at optical disk 17, are incident on three-beam-diffraction polarizing hologram 21 by way of objective lens 16, quarter-wave plate 15, and collimating lens 14; and the main beam and respective side beams being diffracted at three-beam-diffraction polarizing hologram 21, light of order ±1 from the main beam and the respective side beams is incident at photodiode 22.

Three-beam-diffraction polarizing hologram 21, like polarizing hologram 13 of FIG. 1, diffracts either only p-polarized light or only s-polarized light. In addition, in the event that the laser light from laser chip 11 is p-polarized light, a three-beam-diffraction polarizing hologram which will diffract only s-polarized light might be employed as three-beam-diffraction polarizing hologram 21; and in the event that the laser light from laser chip 11 is s-polarized light, a three-beam-diffraction polarizing hologram which will diffract only p-polarized light might be employed as three-beam-diffraction polarizing hologram 21.

This being the case, one or more laser light from laser chip 111 will be transmitted through three-beam-diffraction polarizing hologram 21. In addition, after all of the laser light emitted toward optical disk 17 is transmitted through three-beam-diffraction polarizing hologram 21 it is transmitted through quarter-wave plate 15, and, after being reflected at this optical disk 17, it is again transmitted through quarter-wave plate 15 and is incident on three-beam-diffraction polarizing hologram 21. Accordingly, laser light being transmitted twice through quarter-wave plate 15 and the direction of polarization thereof being rotated by 90 degrees before it is incident on three-beam-diffraction polarizing hologram 21, even where laser light was p-polarized when it was transmitted through three-beam-diffraction polarizing hologram 21 from laser chip 11, as it will be s-polarized when it is again transmitted through three-beam-diffraction polarizing hologram 21 after being reflected from optical disk 17, it will be diffracted by three-beam-diffraction polarizing hologram 21. Or even where laser light was s-polarized when it was transmitted through three-beam-diffraction polarizing hologram 21 from laser chip 11, as it will be p-polarized when it is again transmitted through three-beam-diffraction polarizing hologram 21 after being reflected from optical disk 17, it will be diffracted by three-beam-diffraction polarizing hologram 21. In addition, light of order ±1 produced as a result of diffraction of laser light by three-beam-diffraction polarizing hologram 21 is incident on photodiode 22.

Here, taking the intensity of the laser light emitted from laser chip 11 to be 1, and taking the ratio of the intensities of the light of order 0 and of order ±1 produced as a result of diffraction by three-beam-diffraction polarizing hologram 21 to be 1:4:1 (order −1:order 0:order +1), the fractional amount of light of order ±1 which is incident on photodiode 22 will be 1×(2/6). Furthermore, even looking at the main beam or either of the respective side beams alone, such as would be the case if either light of order +1 or light of order −1 were to be selectively used as will be described below, the fractional amount of light of order 1 available for use by photodiode 22 would be 1×(1/6). Accordingly, satisfactory utilization of laser light is achieved.

Furthermore, the main beam and the respective side beams being almost completely diffracted by three-beam-diffraction polarizing hologram 21, they do not return to laser chip 11 and so do not represent a source of optical noise.

Figure 4:
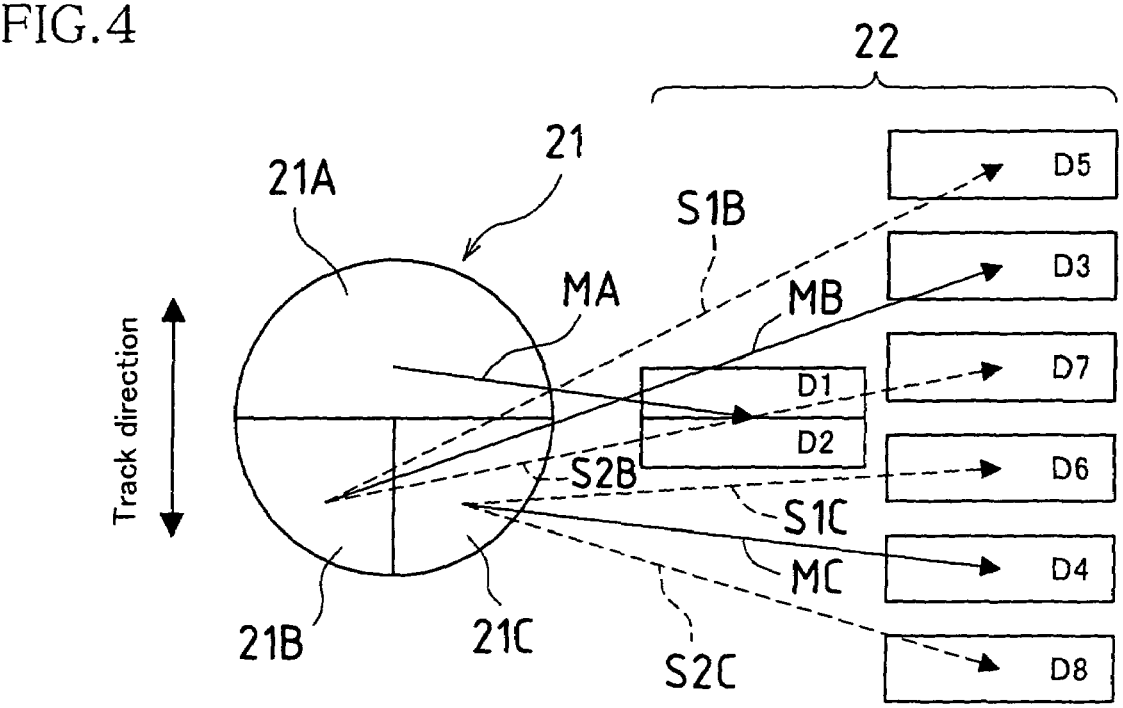
FIG. 4 is a diagram showing correspondence between various three-beam-diffraction polarizing hologram regions and various photodiode regions in the device at FIG. 3.

Now, three-beam-diffraction polarizing hologram 21 is divided into three regions 21A, 21B, and 21C as shown in FIG. 4. Furthermore, photodiode 22 is divided into eight regions D1 through D8 as shown in FIG. 4.

Figure 5:
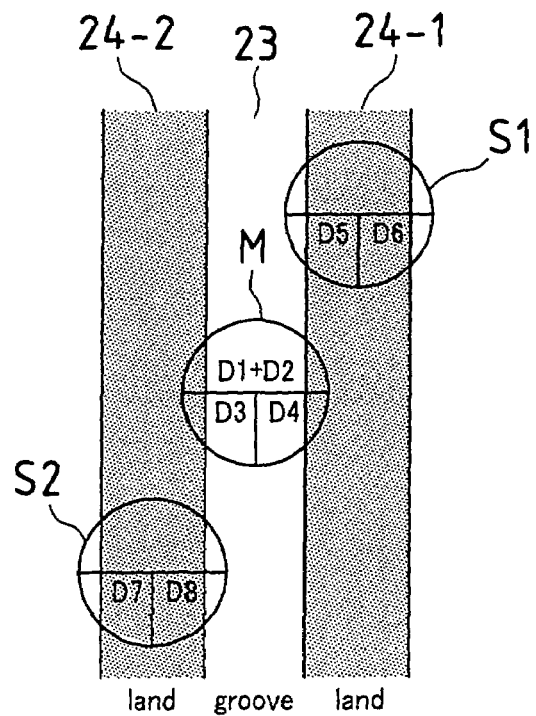
FIG. 5 is a diagram showing, in schematic fashion, locations at which a main beam and two side beams are incident on an optical disk in the device at FIG. 3.
Figure 6:
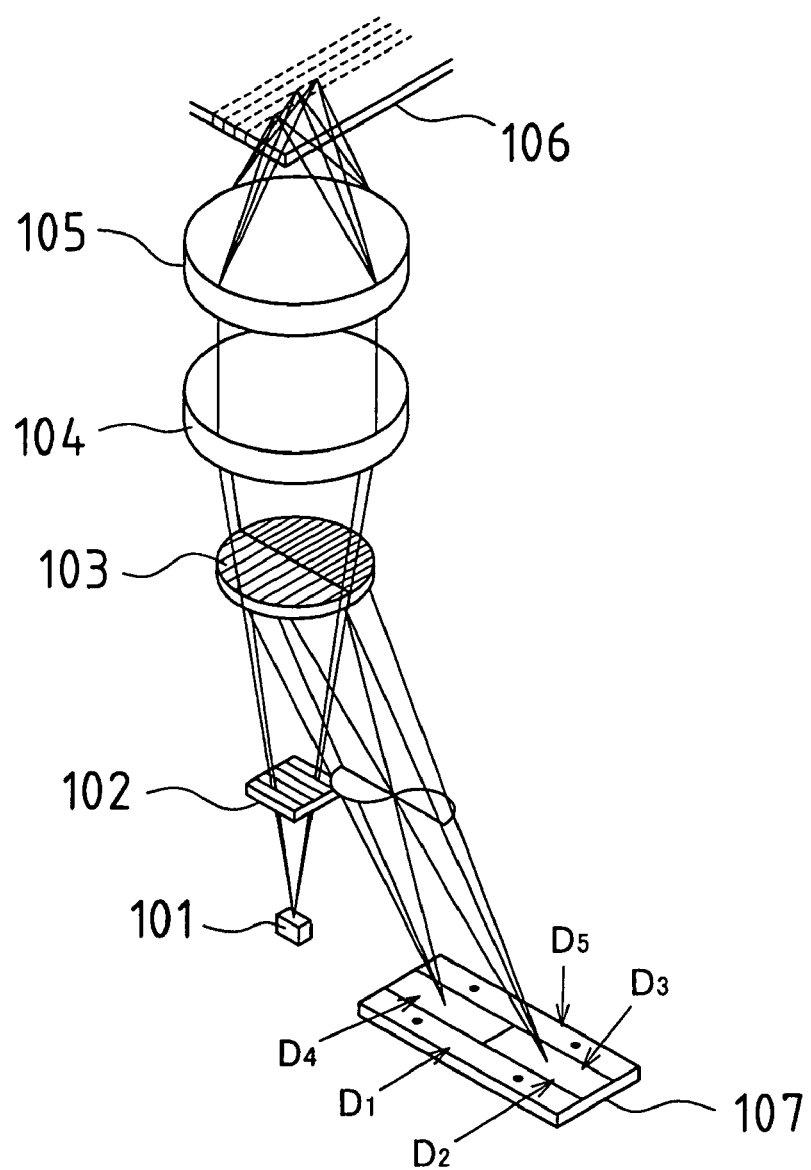
FIG. 6 is an oblique view showing an example of a conventional optical pickup device.

As shown in FIG. 5, main beam M, produced as a result of splitting by diffraction grating 12 of laser light emitted from laser chip 11, is incident on groove 23 for writing of information, this groove 23 being present in track(s) on optical disk 17; and after being reflected by this groove 23, this main beam M is incident on three-beam-diffraction polarizing hologram 21 by way of objective lens 16, quarter-wave plate 15, and collimating lens 14. In addition, main beam component MA, produced as a result of diffraction by region 21A of three-beam-diffraction polarizing hologram 21, is incident on respective regions D1 and D2 of photodiode 22; main beam component MB, produced as a result of diffraction by region 21B of three-beam-diffraction polarizing hologram 21, is incident on region D3 of photodiode 22; and main beam component MC, produced as a result of diffraction by region 21C of three-beam-diffraction polarizing hologram 21, is incident on region D4 of photodiode 22.

Furthermore, as shown in FIG. 5, one of the side beams S1, produced as a result of splitting by diffraction grating 12 of laser light emitted from laser chip 11, is incident on one of the guide lands 24-1, this land 24-1 being present in track(s) on optical disk 17; and after being reflected by this land 24-1, this side beam S1 is incident on three-beam-diffraction polarizing hologram 21 by way of objective lens 16, quarter-wave plate 15, and collimating lens 14. In addition, side beam component S1B, produced as a result of diffraction by region 21B of three-beam-diffraction polarizing hologram 21, is incident on region D5 of photodiode 22; and side beam component S1C, produced as a result of diffraction by region 21C of three-beam-diffraction polarizing hologram 21, is incident on region D6 of photodiode 22.

Moreover, as shown in FIG. 5, the other of the side beams S2, produced as a result of splitting by diffraction grating 12 of laser light emitted from laser chip 11, is incident on the other of the guide lands 24-2, this land 24-2 being present in track(s) on optical disk 17; and after being reflected by this land 24-2, this side beam S2 is incident on three-beam-diffraction polarizing hologram 21 by way of objective lens 16, quarter-wave plate 15, and collimating lens 14. In addition, side beam component S2B, produced as a result of diffraction by region 21B of three-beam-diffraction polarizing hologram 21, is incident on region D7 of photodiode 22; and side beam component S2C, produced as a result of diffraction by region 21C of three-beam-diffraction polarizing hologram 21, is incident on region D8 of photodiode 22.

In this way, the main beam M and the respective side beams S1 and S2 are diffracted by regions 21A, 21B, and 21C of three-beam-diffraction polarizing hologram 21, and the resulting component beams are incident in distributed fashion on respective regions D1 through D8 of photodiode 22.

Moreover, it is preferred that light of order ±1 be put to different uses; e.g., such that the beams incident on respective regions D3 and D4 of photodiode 22 are light of order +1, and the beams incident on the other respective regions D1, D2, and D5 through D8 are light of order −1. This is because allocation of respective functions to light of order +1 and light of order −1 will increase degrees of freedom during design of the optical pickup device and will make it easier to optimize performance.

Here, taking the respective signals output by respective regions D1 through D8 of photodiode 22 following photoelectric conversion by respective regions D1 through D8 to be d1 through d8, the RF signal (information signal) and tracking error signal PP (where the push-pull (PP) method is employed) are given by Formulas (1) and (2), below.

$$RF = d1 + d2 + d3 + d4 \quad (1)$$

$$PP = d3 - d4 \quad (2)$$

Furthermore, instead of employing the push-pull (PP) method and obtaining the tracking error signal from the difference in intensities between respective signals d3 and d4, there is no objection to employing the differential phase detection (DPD) method and obtaining the tracking error signal from the difference in phase between respective signals d3 and d4.

Moreover, the differential push-pull (DPP) method may alternatively or additionally be employed. Where this is the case, tracking error signal DPP is given by Formula (3), below.

$$DPP = (d4 - d3) - k((d5 - d6) + (d7 - d8)) \quad (3)$$

Taking the ratio of the intensities of the main beam M and respective side beams S1 and S2 to be a:b:b (M:S1:S2), coefficient k at this Formula (3) is given by k=a/(2b).

Note that there is no objection to any appropriate alteration with respect to arrangement of the like of respective regions D1 through D8 of photodiode 22 and/or with respect to which among the light of order ±1 from the main beam and the respective side beams is converted into electrical signals at photodiode 22.

Furthermore, there is no objection to using side beam(s) to read and/or write user information, and/or to detect optical disk surface runout.

As described above, the optical pickup device in one or more embodiments of the present invention permits one or more laser light to be transmitted through polarizing hologram(s) and quarter-wave plate(s) such that it exits therefrom so as to be directed toward optical disk(s), and, after being reflected at optical disk(s) and transmitted through quarter-wave plate(s), permits the laser light to be incident on polarizing hologram(s) and permits light of order ±1 produced as a result of diffraction of laser light by polarizing hologram(s) to be incident on light-receiving element(s). This makes it possible for satisfactory utilization of laser light to be achieved. Furthermore, light of order 0 transmitted through polarizing hologram(s) does not return to laser chip(s) and so does not represent a source of optical noise.

Furthermore, employment of integral structure(s) comprising appropriate combination of laser chip(s), diffraction grating(s), polarizing hologram(s), quarter-wave plate(s), and/or light-receiving element(s) permits achievement of increased precision and simplification of optical pickup device structure.

Moreover, because diffraction grating(s), polarizing hologram(s), and quarter-wave plate(s) may be arranged in order along one or more optical paths from laser chip(s) to optical disk(s), laser light may be split into main beam(s) and side beams by diffraction grating(s) before being used.

Furthermore, any of the various tracking error detection techniques may be applied to optical pickup device(s) in accordance with one or more embodiments of the present invention.

Moreover, the present application claims right of benefit of prior filing dates of Japanese Patent Application No. 2002-230179 and Japanese Patent Application No. 2003-150991, the content of both of which is incorporated herein by reference in its entirety. Furthermore, all references cited in the present specification are specifically incorporated herein by reference in their entirety.

What is claimed is:

1. An optical system for an optical pickup device in which light is emitted from a light source, reflected by an optical disk, and detected by a light receiving device, the optical system comprising:
    a diffraction grating optically coupled to the light source;
    a polarizing hologram optically coupled to said diffraction grating, said polarizing hologram diffracting either only p-polarized light or only s-polarized light, said polarizing hologram only diffracts light polarized in a direction perpendicular to a direction of polarization of at least a portion of light emitted from the light source;
    a quarter-wave plate optically coupled to said polarizing hologram, said quarter-wave plate converting linearly polarized light into circularly polarized light and/or converting circularly polarized light into linearly polarized light;
    wherein, in operation, the entirety of the light emitted from the light source impinges upon the optical disk via said diffraction grating, said polarizing hologram, and said quarter-wave plate, and said light is reflected by the optical disk and is caused to pass through said quarter-wave plate and said polarizing hologram such that, in said light, at least a light of ±1 impinges upon the light receiving device and light of order 0 does not return to the light source.

2. The optical system according to claim 1, said diffracting grating, said polarizing hologram and said quarter-wave plate being arranged in order along an optical path from the light source to the optical disk.

3. The optical system according to claim 1, wherein the light source emits laser light having a center wavelength at approximately 780 nm and a three-beam method is used as a tracking error detection technique.

4. The optical system according to claim 1, wherein the light source emits laser light having a center wavelength at approximately 650 nm and a push-pull method is used as a tracking error detection technique.

5. An optical pickup device,
wherein the entirety of laser light emitted from a laser chip exits toward an optical disk by way of a diffraction grating, a hologram and a quarter-wave plate in this order, and the laser light is reflected by the optical disk and is caused to pass through at least the quarter-wave plate and the hologram in this order such that in said laser light, at least a light of ±1 is incident on a light receiving device and light of order 0 does not return to the laser chip, comprising;
a polarizing hologram diffracting only light polarized in one or more directions perpendicular to at least one direction of polarization of at least a portion of the laser light emitted from the laser chip is employed as the hologram; and
the quarter-wave plate being provided on at least one or more optical paths between the optical disk and the polarizing hologram.

6. An optical pickup device according to claim 5,
wherein the diffraction grating, the polarizing hologram, and the quarter-wave plate are arranged in order along one or more optical paths from the laser chip to the optical disk.

7. An optical pickup device according to claim 5,
wherein at least one wavelength of at least a portion of the laser light emitted from of the laser chip is 780 nm, and a three-beam method is used as a tracking error detection technique.

8. An optical pickup device according to claim 5,
wherein at least one wavelength of at least a portion of the laser light emitted from the laser chip is 650 nm, and a push-pull method is used as a tracking error detection technique.

9. An optical pickup device according to claim 5, wherein
said polarizing hologram is a three-beam-diffraction polarizing hologram for diffracting one of p-polarized light or s-polarized light, wherein
in the case that the laser light emitted from said laser chip is p-polarized light, said three-beam-diffraction polarizing hologram is of the type for diffracting only s-polarized light, or
in the case that the laser light emitted from said laser chip is s-polarized light, said three-beam-diffraction polarizing hologram is of the type for diffracting only p-polarized light.

10. An optical pickup device according to claim 9, wherein
said three-beam-diffraction polarizing hologram comprises three regions, and
said light-receiving element comprises a photodiode divided into eight regions,
wherein
incident light reflected by the optical disk is diffracted by the three regions of said three-beam-diffraction polarizing hologram producing component beams, said component beams are distributed on respective regions of said photodiode.

11. An optical pickup device according to claim 10 wherein
the regions of the photodiode produce respective output signals, and a tracking error signal is based on a difference between two of said output signals.

12. An optical pickup device according to claim 10, wherein
the regions of the photodiode produce respective output signals, and a tracking error signal is based on a difference in phase between two of said output signals.

* * * * *